Oct. 30, 1956
H. C. KARCHER
2,768,498
RETRACTABLE AFTERBURNER
Filed Dec. 15, 1950
2 Sheets-Sheet 1
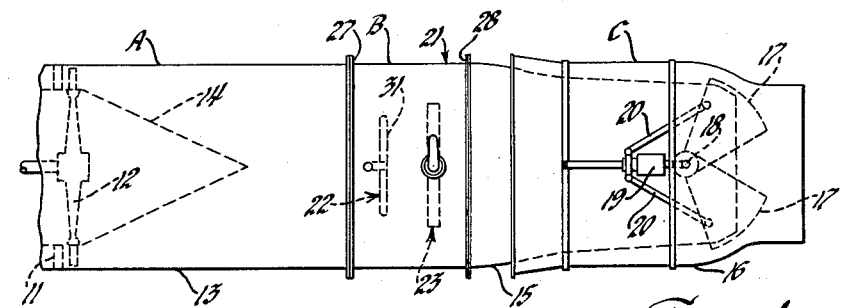
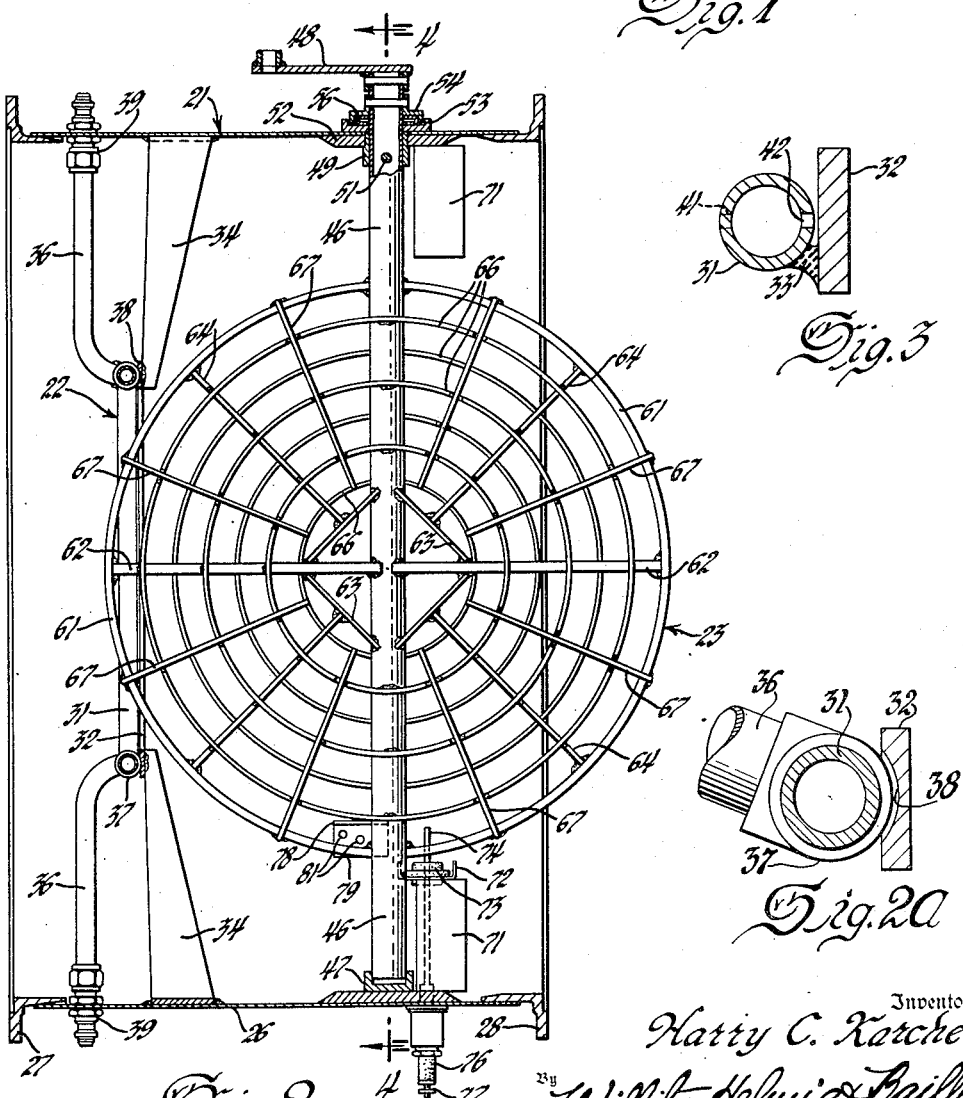
Inventor
Harry C. Karcher
By Willits, Helwig & Baillio
Attorneys

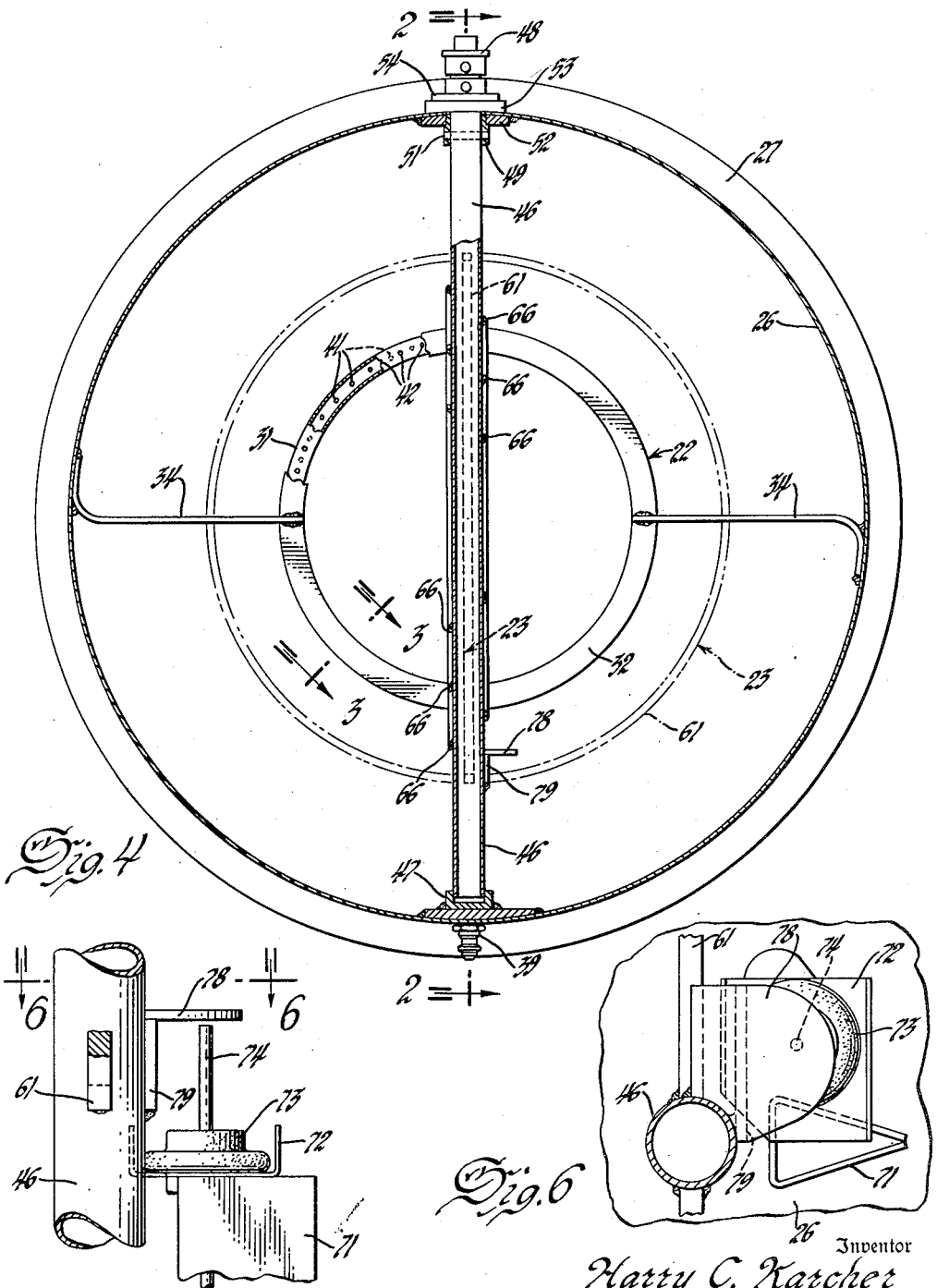

United States Patent Office 2,768,498
Patented Oct. 30, 1956

2,768,498

RETRACTABLE AFTERBURNER

Harry C. Karcher, Indianapolis, Ind., assignor to General Motors Corporation, Detroit, Mich., a corporation of Delaware Application December 15, 1950, Serial No. 201,011

9 Claims. (Cl. 60—39.72)

My invention relates to jet propulsion apparatus, primarily to gas turbine jet propulsion engines, and more particularly to an afterburner mechanism for such engines.

It is well known that the gases exhausted from a gas turbine engine to provide a propulsive jet contain a substantial proportion of uncombined oxygen because of the low fuel-to-air ratio in the combustion apparatus of such engines. Normally, only about one-quarter of the oxygen in the air supplied by the compressor of the gas turbine engine combines with the fuel burned therein to form the motive fluid for the turbine.

Various proposals have been made, therefore, to burn additional fuel in the stream of gas exhausted from the turbine to increase the energy of the propulsive jet and thereby the thrust derived therefrom.

Combustion devices for this purpose are commonly known as afterburners. While afterburners have been built and operated with reasonable satisfaction, all such afterburners, so far as I am aware, suffer from various disadvantages which this invention eliminates.

Suitable apparatus, commonly called flame holders, must be provided in the exhaust duct or tail pipe of the engine to promote the combustion of the fuel, since, in general, combustion cannot be maintained efficiently by simply spraying fuel into the tail pipe. One disadvantage of prior afterburners is that the flame holder, which serves to create turbulence in the gas stream and thus prevent the flame from blowing out the exhaust nozzle, causes considerable loss in the head of the gas stream in the tail pipe. Since the afterburner is used only occasionally, as for take-off emergency power, the loss of power of the engine under normal conditions with the afterburner out of operation constitutes a serious defect of prior afterburners.

Another disadvantage of prior afterburners is that it has been deemed necessary to employ high pressure fuel systems to secure adequate atomization of the fuel so as to promote good combustion. Such high pressure fuel systems require a relatively heavy and expensive installation of pumps, regulators, and fuel nozzles which, as indicated above, is only in use during a very small fraction of the time the engine is in operation.

The present invention involves a novel and ingenious afterburner arrangement in which the parasitic drag of the afterburner is greatly reduced when the device is not in operation and in which a highly satisfactory level of atomization of the fuel is obtained with a simple nozzle arrangement and a low pressure supply system.

The principal objects of the invention are to provide an improved afterburner for turbojet engines, to reduce the power loss occasioned by the resistance to air flow of the afterburner mechanism, and to secure good atomization and dispersion of the fuel with a simple nozzle arrangement supplied at low pressure.

The preferred manner in which these objects are realized and the advantages of the invention will be clear to those skilled in the art from the appended detailed description of the preferred embodiment of the invention and the accompanying drawings, in which Figure 1 is a diagrammatic view of the exhaust end of a turbojet engine with the afterburner of the invention thereon; Figure 2 is a vertical sectional view of the afterburner in inactive or retracted position, taken on the plane indicated by the line 2—2 in Fig. 4; Figure 2a is an enlarged detail section taken on the same plane as Figure 2 showing the connection of the supply pipe to the fuel manifold; Figure 3 is a detail sectional view taken on the plane indicated by the line 3—3 in Figure 4; Figure 4 is a transverse sectional view taken on the plane indicated by the line 4—4 in Figure 2; Figure 5 is a fragmentary elevation view of the afterburner in active position illustrating the ignition apparatus; and Figure 6 is a fragmentary plan view of the afterburner in active position illustrating the ignition apparatus, taken on the plane indicated by the line 6—6 in Fig. 5.

Since the general structure of gas turbine jet engines is quite familiar to those skilled in the art, it is believed unnecessary to describe in detail such engines or the manner in which the afterburner of the invention is incorporated in such an engine. The installation is illustrated rather diagrammatically in Figure 1, in which the exhaust end of a turbojet engine is indicated at A. The engine includes a turbine nozzle ring 11, a bladed turbine wheel 12, and a tail pipe 13 and tail cone 14 which together define the exhaust passage from the turbine. The afterburner B of the invention comprises a duct 21 of large diameter mounted on the tail pipe 13. The exhaust gases from the turbine are supplied with fuel and flame is initiated in the afterburner assembly B. The gases leaving the afterburner B flow into a nozzle section C in which combustion is completed and from which they are discharged to form the propulsive jet for the aircraft. The assembly C may be of any suitable nature, but, as illustrated, comprises a jet pipe 15 around which is mounted a shroud 16. The area of the outlet from the jet pipe 15 is variable by valve members 17 commonly known as "eye lids" which may be rotated about an axis 18 by an actuating cylinder 19 and connecting links 20.

Since it is common practice to provide a variable nozzle structure of one form or another for jet engines in which an afterburner is incorporated, and the invention is independent of the form and nature of the variable nozzle, the nozzle arrangement will not be described in detail. The afterburner mechanism of the invention, as illustrated generally in Figure 1, comprises the duct or pipe 21, a fuel manifold 22, and a flame holder grid 23. The flame holder grid is illustrated in Figure 1 as disposed transversely of the duct, which is its position when the afterburner is in operation. In Figures 2 and 4, the flame holder is illustrated as rotated 90 degrees about its mounting axis to the retracted or inactive position for the greatest clarity of illustration. The flame holder grid is rotated to the retracted position of Figures 2 and 4 when the afterburner is out of operation, thus greatly reducing the resistance to gas flow of the grid and significantly improving the efficiency of the engine.

Considering now the preferred structure of the invention in detail, the duct 21 may comprise a cylindrical tube 26 of heat resisting sheet metal welded or otherwise united to flanges 27 and 28 by which it is bolted or clamped to the sections A and C.

The fuel manifold assembly 22 comprises a tubular nozzle ring 31 mounted coaxially with the duct. The ring 31 is welded to a flat ring or annular plate 32 of strip metal (Figure 3) by a plurality of welds 33 spaced around the rings. The ring 32 is supported from the tube 26 by four sheet metal struts 34 welded to the ring and bent over at the outer ends, as will be apparent in Figure 4, and welded to the tube 26. Because of the curvature of the struts 34, they readily bend or flex to accommodate thermal expansion of the ring 32 and tube 26. The nozzle ring 31 is supplied with fuel preferably by two pipes 36 entering the duct and welded to the nozzle ring 31. A sleeve 37 may be welded over the ring 31 at each point of entry of the tubes 36, and the ring 32 is cut back slightly at these points to clear the sleeves as indicated at 38. The fuel supply tubes 36 may be provided with fittings indicated generally at 39 by which the tubes are led through the tube 26 and by which an external fuel line is connected to the tubes 36. Since these fittings 39 may follow standard aircraft practice, they are not described in detail.

The fuel nozzle arrangement of the invention is highly significant from the standpoint of superior results from a simple structure. The nozzle ring 31 is drilled to provide a large number of holes in both the forward or upstream and the rearward or downstream face of the ring. These are illustrated in Figure 3, in which the upstream holes are indicated at 41 and the downstream holes at 42. Preferably, these two groups of holes are staggered relative to each other. While the size of the holes may be varied, a hole of approximately one-sixteenth inch diameter has been found highly satisfactory for use with a fuel pressure of fifty to sixty pounds per square inch above the gas pressure in the duct. The nozzle ring 31 is located very close to the plate 32, the preferred spacing being one-hundredth of an inch so that the fuel escaping from the holes 42 is sprayed out perpendicularly to the direction of air flow. As will be noted, the width of the ring 32 is greater than the diameter of the tube so that the gases flowing over the tube strike the marginal portions of the annular plate 32 and the fuel flowing across the surface thereof. A very superior level of atomization and mixing of the fuel is accomplished by this arrangement in conjunction with the upstream injection of fuel through the holes 41.

The flame holder assembly 23 is located a sufficient distance downstream from the nozzle assembly to provide opportunity for thorough mixing of the fuel with the combustion gases before the flame holder is reached and to provide clearance for the flame holder when it is rotated to the retracted position of Figure 2. The flame holder may take various forms adapted to initiate sufficient turbulence in the air stream to prevent blowing out of the flame and creating as small a loss of head as practicable in both the operative and inoperative positions. A form which is preferred is illustrated in Figures 2 and 4. The flame holder 23 is mounted on a shaft 46 which may be tubular and which is disposed on a diameter of the tube 26. A bearing or socket 47 for one end of the shaft 46 is welded to the interior of the tube 26 and the other end of the shaft extends through the wall of the duct and has pinned thereon a crank or a lever 48 by which the shaft 46 and the flame holder are rotated. The crank end of the shaft is fitted with a thrust collar 49, secured by a pin 51, which is journaled in a plate 52 welded to the duct.

A seal arrangement provided on the outside of the duct around the shaft comprises a flanged disk 53 secured to the duct and a flanged disk 54 pinned to the shaft 46 and entering within the flange of the disk 53. A resilient annular metal seal 56, which is U-shaped in cross section with the open side toward the shaft, is mounted in the chamber between the disks 53 and 54. Gas entering between the faces of the seal tends to open the seal and press it against the disks.

The flame holder 23 comprises two semicircular marginal bars 61, two radial bars 62, diagonal strips 63 joining the bars 62 and the shaft 46, radial rods or strips 64 extending from the strips 63 to the marginal bars 61, all of which constitute the basic framework of the flame holder, these parts being welded together as indicated in the drawings. A number of rings 66 of heavy wire or light rod and of stepped radii are welded to the front and rear faces of the frame, alternating between the two faces of the flame holder in order of decreasing diameter. Additional radial members 67 welded to the rings 66 stiffen the structure and provide additional turbulence. As will be apparent, when this structure is in the retracted position of Figures 2 and 4, the tube 26 is substantially unobstructed. When it is rotated to the operative position indicated in Figure 1, effective flame holding is obtained and the resistance to gas flow is moderate.

Triangular prismatic fairings 71 (Figures 2, 5 and 6) formed of sheet metal and welded to the bearing members 47 and 52 are located downstream of the shaft 46 to reduce turbulence. The lower fairing member 71 also serves as a support for the spark ignition electrode. As illustrated in Figures 2, 5 and 6, a channel plate 72 welded to the support 71 mounts an insulator 73 through which the high tension electrode 74 projects. The outer end of the electrode 74 is supported in an insulator assembly 76 which includes a terminal 77 to which the high tension ignition circuit is connected. The spark plug support 76 may be of known commercial type and may be secured to the tube 26 in a conventional manner. The ignition spark jumps from the electrode 74 to an electrode plate 78 welded to the shaft 46 and thereby grounded. By virtue of this arrangement, the ignition is disabled when the flame holder is retracted. A plate 79 is mounted on the shaft 46 so as to be disposed transversely of the duct when the flame holder is in operating position. The plate 79, which is formed with several small holes 81, provides a shield against the direct air flow at the spark gap, thus aiding the initiation of combustion by the spark.

In the normal operation of the engine, the flame holder is retracted and no fuel is supplied to the nozzle ring 31. When it is desired to augment thrust by afterburning the shaft 46 is rotated ninety degrees by any suitable mechanism (not shown). Fuel is supplied through the tubes 36 and the spark electrode 74 is energised from a suitable high tension source. The fuel issuing from the ring 31 is atomized and is vaporized by the stream of hot gas, which ordinarily is above one thousand degrees F. The mixture of fuel and combustion gases is ignited by the spark plug, and combustion ensues downstream of the flameholder 23, which establishes sufficient turbulence to prevent blowing out the flame. In order to accommodate the greater volume of gases resulting from afterburning, the valves 17 are opened to enlarge the outlet of the jet pipe 15. The spark plug may be deenergized when combustion is established. To terminate the afterburning, the fuel supply is shut off, the valves 17 are closed, and the flame holder is turned to its retracted position.

The retractable afterburner illustrated has been found by tests in a typical jet engine installation to provide a gain of one hundred pounds in thrust in normal operation due to retraction of the flame holder. This is a substantial gain, as will be apparent from the fact that it is the equivalent of one hundred thrust horsepower at 375 miles per hour.

The detailed description of the preferred embodiment of the invention is not to be construed as limiting the scope of the invention, inasmuch as many variations may be made by those skilled in the art within the scope of the invention.

I claim:

1. An afterburner for a gas turbine engine or the like comprising, in combination, a gas duct, a tubular ring mounted in the duct transversely of the duct axis, means for conducting fuel to the ring, the ring being formed with orifices for emission of fuel upstream and downstream of the duct, an annular plate immediately downstream of the ring adapted to deflect fuel flowing from the downstream orifices, a flame holder grid in the duct downstream from the ring mounted for rotation about an axis transverse to the duct, and ignition means adjacent to the flame holder.

2. An afterburner for a gas turbine engine or the like comprising, in combination, a gas duct, means for carbureting gas flowing into the duct, a flame holder in the duct downstream from the carbureting means mounted for movement between an operative and a retracted position, ignition means, and means activated by movement of the flame holder to operative position to render the ignition means operative.

3. An afterburner for a gas turbine engine or the like comprising, in combination, a gas duct, means for carbureting gas flowing into the duct, a flame holder in the duct downstream from the carbureting means mounted for movement between an operative and a retracted position, ignition means including two spark gap electrodes, and means activated by movement of the flameholder to operative position to render the ignition means operative by relative movement of the electrodes.

4. An afterburner for a gas turbine engine or the like comprising, in combination, a gas duct, a tubular ring mounted in the duct transversely of the duct axis, means for conducting fuel to the ring, the ring being formed with orifices for emission of fuel upstream and downstream of the duct, an annular plate immediately downstream of the ring adapted to deflect fuel flowing from the downstream orifices, and a flame holder grid mounted in the duct downstream from the ring.

5. A combustion apparatus comprising, in combination, a gas duct having an upstream end and a downstream end and means for dispersing a fluid in a gas stream flowing through the duct comprising a tubular manifold in the duct formed with fluid outlet orifices in the upstream and downstream faces thereof, means for conducting fluid to the manifold, a deflector plate closely adjacent the downstream outlet orifices and projecting beyond the margins of the manifold, and a flame holder mounted in the duct downstream from the manifold.

6. A combustion apparatus comprising, in combination, a gas duct having an upstream end and a downstream end and means for dispersing a fluid in a gas stream flowing through the duct comprising a tubular manifold in the duct formed with fluid outlet orifices in the downstream face thereof, means for conducting fluid to the manifold, and a deflector plate closely adjacent the said outlet orifices and projecting beyond the margins of the manifold.

7. A combustion apparatus comprising, in combination, a gas duct having an upstream end and a downstream end and means for dispersing a fluid in a gas stream flowing through the duct comprising a tubular manifold in the duct formed with fluid outlet orifices in the downstream face thereof, means for conducting fluid to the manifold, and a deflector plate closely adjacent the said outlet orifices and projecting beyond the margins of the manifold, the distance between the orifices and the deflector plate being less than the diameter of the orifices.

8. A combustion apparatus comprising, in combination, a gas duct having an upstream end and a downstream end and means for dispersing a fluid in a gas stream flowing through the duct comprising a tubular manifold in the duct formed with fluid outlet orifices in the upstream and downstream faces thereof, means for conducting fluid to the manifold, and a deflector plate closely adjacent the downstream outlet orifices and projecting beyond the margins of the manifold.

9. A combustion apparatus comprising, in combination, a gas duct having an upstream end and a downstream end and means for dispersing a fluid in a gas stream flowing through the duct comprising a tubular manifold in the duct formed with fluid outlet orifices in the upstream and downstream faces thereof, means for conducting fluid to the manifold, a deflector plate closely adjacent the downstream outlet orifices and projecting beyond the margins of the manifold, and means for mounting the manifold and deflector plate in the duct with provision for radial expansion of the duct relative thereto.

References Cited in the file of this patent

UNITED STATES PATENTS

| | | |
|---|---|---|
| 424,305 | Jones | Mar. 25, 1890 |
| 926,473 | Disbrow | June 29, 1909 |
| 1,085,265 | Jones | Jan. 27, 1914 |
| 1,132,296 | Anspach | Mar. 16, 1915 |
| 1,349,874 | Coles | Aug. 17, 1920 |
| 2,085,800 | Goddard | July 6, 1937 |
| 2,220,603 | Hirtz | Nov. 5, 1940 |
| 2,385,883 | Nahigyan | Oct. 2, 1945 |
| 2,508,420 | Redding | May 23, 1950 |
| 2,540,594 | Price | Feb. 6, 1951 |
| 2,572,723 | Hildestad | Oct. 23, 1951 |
| 2,639,578 | Pouchot | May 26, 1953 |
| 2,640,321 | Pouchot | June 2, 1953 |
| 2,707,372 | Cleveland | May 3, 1955 |

FOREIGN PATENTS

| | | |
|---|---|---|
| 158,126 | Great Britain | Feb. 3, 1921 |
| 648,497 | Great Britain | Jan. 3, 1951 |
| 922,032 | France | Jan. 20, 1947 |
| 298,145 | Germany | June 1, 1917 |

OTHER REFERENCES

S. A. E. Journal, September 1946, pages 507, 508.